United States Patent
Mayerberg, II et al.

(10) Patent No.: US 6,712,353 B1
(45) Date of Patent: Mar. 30, 2004

(54) MASS AND IMPACT ENERGY ADAPTIVE COMPENSATING CONVERTER

(75) Inventors: Willson L. Mayerberg, II, Skiatook, OK (US); Joe C. Bollinger, Tulsa, OK (US); Jack E. Olson, Tulsa, OK (US)

(73) Assignee: Lockheed Martin Corporation, Bethesda, MD (US)

( * ) Notice: Subject to any disclaimer, the term of this patent is extended or adjusted under 35 U.S.C. 154(b) by 4 days.

(21) Appl. No.: 10/263,689

(22) Filed: Oct. 4, 2002

(51) Int. Cl.[7] ............................................. B65H 29/068
(52) U.S. Cl. ....................................... 271/183; 271/231
(58) Field of Search ................................. 271/183, 231; 226/38; B65H 29/68

(56) References Cited

U.S. PATENT DOCUMENTS

| | | |
|---|---|---|
| 3,804,395 A | 4/1974 | Muller |
| 3,948,023 A | 4/1976 | Mumma |
| 4,019,730 A | 4/1977 | Staudinger et al. |
| 4,518,160 A | 5/1985 | Lambrechts et al. |
| 5,154,276 A | 10/1992 | Lehtola |
| 5,569,016 A * | 10/1996 | Mokler .................... 414/793.1 |
| 5,613,673 A * | 3/1997 | Roberts et al. ............. 271/182 |
| 5,682,973 A | 11/1997 | Holmes et al. |
| 5,931,461 A | 8/1999 | Xu |

FOREIGN PATENT DOCUMENTS

| | | | | |
|---|---|---|---|---|
| JP | 60-197561 | * | 10/1985 | ........... B65H/29/52 |
| WO | WO 99/41021 | | 1/1999 | |

* cited by examiner

*Primary Examiner*—Donald P. Walsh
*Assistant Examiner*—Kenneth W Bower
(74) *Attorney, Agent, or Firm*—Whitham, Curtis & Christofferson, P.C.

(57) ABSTRACT

An object arresting device prevents rebounding effects when an object is decelerated from a high velocity by causing an impact-induced flow of fluid such as ambient air through a lattice membrane to develop vacuum effects and vortex activity while absorbing and dissipating energy to prevent damage to the object and preventing collisions between objects in a high-speed, high-capacity sorting/transport system. The lattice membrane is preferably formed as a woven fabric of a smooth polymer or synthetic fiber of preferably circular cross-section which causes laminar flow over the fibers and rotational vortex effects in the corners of each aperture which produce a combination of vacuum effects in a direction to oppose rebound motion and energy dissipation effects. The effects produced are proportional to the impact energy and the device is thus adaptive to a wide range of mass and energy limited only by the forces the device can mechanically withstand.

18 Claims, 2 Drawing Sheets

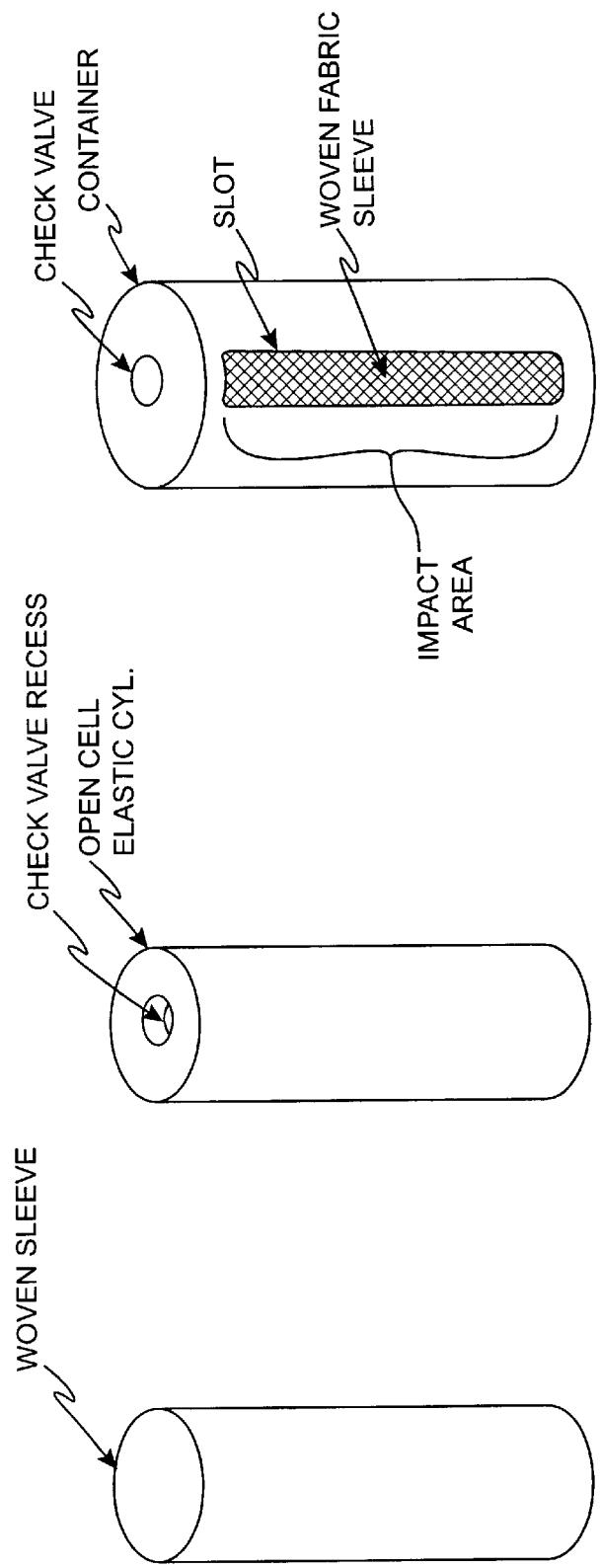

MASS AND IMPACT ENERGY ADAPTIVE COMPENSATING CONVERTER

BACKGROUND OF THE INVENTION

1. Field of the Invention

The present invention generally relates to article transport systems and, more particularly, to a impact energy absorbing structures which are adaptive to mass and impact energy when an object or arbitrary size and shape is brought to a stop from a high but variable velocity.

2. Description of the Prior Art

The transport of material and objects is an important feature of many industrial activities, particularly when material or objects must be moved on a large scale. Many such systems include arrangements for sorting of objects or material in accordance with properties thereof or indicia placed on the objects. For example, large volumes of mail or packages which must be transported to different locations must first be sorted in accordance with addresses placed thereon in the course of being transported to different locations in a sorting facility. Similar systems and applications may be encountered in baggage handling in airports and the like.

Such sorting of objects requires the objects to be handled in sequence in order to provide selectivity of handling and direction to various locations from which groups of objects that can be commonly transported to another location. This requirement generally implies that the objects must be transported at relatively high speed in order to accommodate the volume of objects which are presented. While it is possible to regulate the speed of objects somewhat in a high volume sorting apparatus, it is not generally possible to provide space to allow significant deceleration of objects as they approach their final destination in the sorting machinery. Therefore, as the object approaches a final destination such as a sorting bin or a stacker apparatus (sometimes referred to as a destination pocket or, simply, pocket) in the sorting system, the acceleration must usually be quite abrupt and often involves allowing the object to impact more or less violently on a surface or barrier such as the side of a destination pocket in a largely uncontrolled motion.

Consider a simple letter envelope reaching a stacker in a mail sorting system. The speed of an envelope through a sorting system will often be in the range of one hundred to two hundred inches per second and cannot be diminished significantly as the stacker or pocket is approached. The envelope is thus generally "flown" into the pocket and the edge of the envelope allowed to impact a substantially rigid surface. Even though such an envelope may have a relatively low mass, the momentum may be quite substantial and will result in a rebound from the rigid surface due to the mechanical structure of the envelope, itself. That is, in regard to the above example, an envelope has two structurally dissimilar static surfaces which are joined at the edges by sharp folds; forming essentially a dual-web torsion box. One surface, however, exhibits a greater static and dynamic load-carrying capacity than the other due to the diagonal stiffeners formed by the sealing arrangement. Therefore, an impact of an edge of the envelope with a rigid surface results in an elastic columnar buckling deformation which is proportional to the mass and rigidity of the envelope. The energy of the impact with a rigid surface thus causes a state change of the principal load-bearing webs of the object and the only path for resolution of the resultant deformation-redirected energy is through an aggressive and completely unstable rebound of the object from the surface. Both the direction of the rebound and the shape and change of shape and orientation of the envelope or other object during rebound are completely unpredictable.

The rebound action and object/envelope structural instability greatly increase the likelihood of an event called a "tail collision" as the rebounding product may be struck (at the originally trailing edge or other surface thereof) by the leading edge of one or more incoming objects directed to the same pocket while the space collectively occupied thereby consumes a large portion of the available space in the pocket. The result is a multiple object "jam" in the pocket, often with substantial attendant damage to the objects, which not only prevents intended collection (e.g. stacking) of objects in the pocket but which in also likely to increase in severity through further collisions and may propagate outward from a pocket and cause malfunctions of larger portions of the sorting system. Collisions also result in increased generation of airborne particulates and objectionably high noise levels. The cumulative effect is so frequent and severe that the mechanics of the objects and the velocity arresting process is considered to be the defining entity of the operational integrity of the entire sorting and transport system.

Attempts have been made to provide energy absorbing surfaces for arresting objects in sorting and transport systems. However, the momentum of objects in mail sorting systems and the like can vary widely as can the amount of energy which must be absorbed to limit rebound and may be further complicated by factors such as the movement of contents within an envelope or other object. Attempts to provide energy absorption to date have been found to be very limited in both amount and range of energy which can be absorbed and dissipated while presenting variable geometry in the system pockets. Therefore, while the violence of impact and rebound can be diminished somewhat by the attempts to provide energy absorbing surfaces, the motion of objects and changes in their orientation and shape have been made even more unpredictable and widely variant; resulting in virtually no improvement in prevention of collisions between objects and jamming of the transport/sorting system.

SUMMARY OF THE INVENTION

It is therefore an object of the present invention to provide an adaptive energy absorbing arrangement for arresting motion of objects in a sorting/transport system which can limit rebound of objects, provide increased uniformity of object motion in pockets and avoid collisions of objects and resulting jamming and object damage.

In order to accomplish these and other objects of the invention, a device for arresting motion of an object is provided including a lattice membrane having apertures therein, and an aperture for causing flow of fluid through the membrane when it is displaced or deformed, wherein the aperture is shaped for causing vacuum effects and vortex activity adjacent the membrane in response to the flow of fluid.

In accordance with another aspect of the invention, a method of arresting movement of an object is provided comprising steps of deflecting a apertured membrane with the object and generating vortices at apertures of the membrane in response to the deflection, wherein the vortices cause reduced pressure at a surface of the object.

BRIEF DESCRIPTION OF THE DRAWINGS

The foregoing and other objects, aspects and advantages will be better understood from the following detailed description of a preferred embodiment of the invention with reference to the drawings, in which:

FIGS. 3, 4 and 5 are perspective views of variant forms of the preferred embodiment of the invention.

DETAILED DESCRIPTION OF A PREFERRED EMBODIMENT OF THE INVENTION

Figure 1:
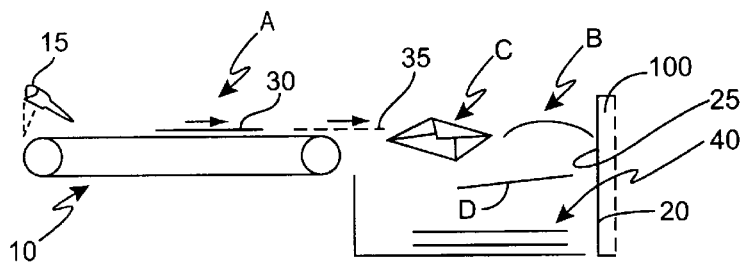
FIG. 1 is a schematic illustration of a destination pocket illustrating the problem addressed by the invention.

Referring now to the drawings, and more particularly to FIG. 1, there is shown, in schematic form, a destination pocket of a sorting/transport machine for explaining the problem addressed by the invention and the application of the invention thereto to address that problem. While it is the principle intention of FIG. 1 to explain the problem of object rebound and collision, the application of the invention thereto is also included. Accordingly, no portion of FIG. 1 is admitted to be prior art in regard to the present invention.

In FIG. 1, a final portion 10 of a conveyor mechanism of a transport/sorting system and a diverter mechanism 15 is shown. The diverter mechanism is used to selectively divert a particular object (e.g. envelope 30) from the transport stream of the system toward a destination pocket 20. Envelope 30 is shown at three sequential positions A, B and C and, ideally will be deposited in stack 40. However, in practice, at position A, envelope 30 is travelling at a relatively high speed and, while it might be possible to control the speed of conveyor portion 10, it is possible that two consecutive objects will be diverted and sufficient speed of conveyor portion 10 must be maintained so that collision of the objects will not occur, particularly before reaching pocket 20. Also, as a practical matter, the space for conveyor portion 10 is limited (and the conveyor portion may be omitted altogether) and little if any space is available for deceleration of objects. Accordingly, the velocity of an object when it reaches pocket 20 is and must be relatively high.

The object/envelope 30 is thus "flown from the end of the conveyor portion 10 or diverter 15 across the pocket 20 and its movement is arrested by striking surface 25, as shown at position B. Surface 25 is usually formed by a side of pocket 20 and is usually rigid. The momentum of the envelope when the envelope strikes surface 25 causes columnar elastic buckling deformation as alluded to above, shown by the arcuate profile of the envelope at position B. The energy contained in the momentum of the envelope is thus stored in the elastic deformation and released by being converted to acceleration and momentum in the opposite direction.

At the same time, since the deformation and shape of the envelope due to the columnar elastic buckling and return to (and possibly oscillating about) its normal shape are not predictable, its aerodynamics are not predictable while its velocity (in the opposite direction) during the rebound may be a substantial fraction of its velocity at position A. Therefore, the notion and orientation of the object/envelope are not predictable as shown at position C where it is relatively likely that a following envelope object 35 may collide therewith and, in any event, orderly placement is stack 40 is severely compromised; both of which can lead to jamming and other undesired effects as discussed above.

Further, as discussed above, attempts to reduce rebounding by making surface 25 more or less compliant and energy absorbent have not been successful due to the wide range of momentum which may be carried by different respective objects and different degrees to which energy may be dissipated by shifting of the contents of the objects, such as a letter sliding within an envelope and dissipating some energy as friction-induced heat. In other words, energy absorbing arrangements, generally including more or less compliant surfaces 25 are limited in the maximum amount of energy which can be absorbed and cannot absorb energy which is stored as elastic deformation of the object/envelope and causes the rebound effect while the momentum of objects/envelopes and the corresponding energy thereof varies much more widely. Known energy absorbing arrangements and compliant surfaces simply cannot adapt to the wide range of energies presented in applications of this type consistent with instant recovery required for repeatable results and effects. Therefore, little reduction in the uncontrolled and unpredictable motion during rebound can be achieved.

Figure 2A:
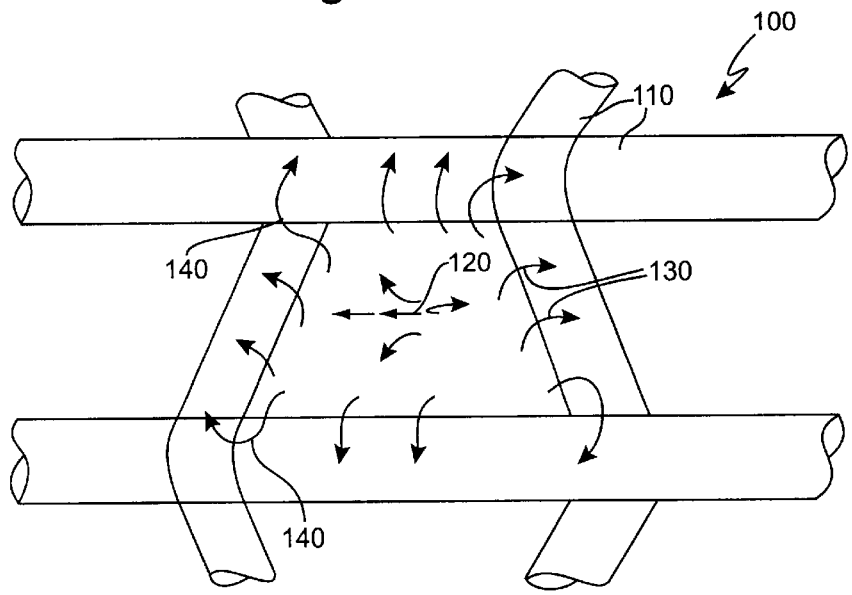
FIGS. 2A and 2B are illustrations of an enlarged portion of the arresting apparatus in accordance with the invention for explaining the principles thereof.
Figure 2B:
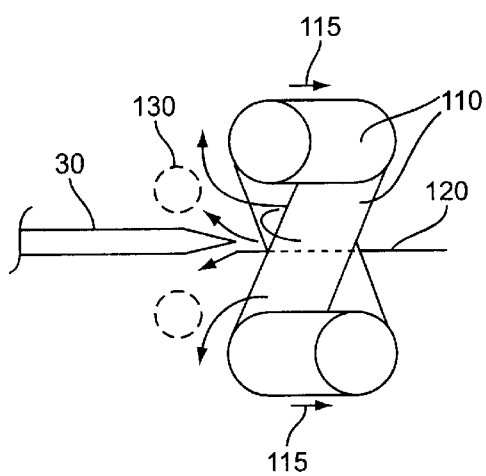

Referring now to FIGS. 2A and 2B, the constitution and principles of the invention will be explained. While the inventors do not wish to be bound by the theory and principles of the invention as will be discussed below, the meritorious effects of the invention have been reliably produced and observed and the following discussion is provided to facilitate enablement of the practice of the invention.

The invention includes a flexible symmetrical lattice membrane which constrains a turbo-mechanically pressurized population of air molecules. That is, in accordance with the invention, the lattice membrane is suspended in such a way that displacement or flexure thereof will cause air flow therethrough in a direction opposite the displacement or flexure. Otherwise, the suspension of the lattice membrane is not critical to the practice of the invention and the invention may be practiced successfully with, for example, a wide range of materials, fabric stand sizes and pitches, applied tension on the membrane and the like. It is however, considered important and preferred, but not critical to the practice of the invention that the membrane present apertures and that the apertures be smooth and present substantial area "wetted" by the air flow as well as supporting substantially laminar air flow over a portion of the interior surfaces of the apertures.

For these reasons, it is preferred that the membrane be woven of smooth monofilament line or fiber 110, preferably of a polymer or other synthetic material, as illustrated in oblique view in FIG. 2A and cross-sectional view in FIG. 2B. It is also preferred that the membrane be stretched at least at low tension across an opening in a chamber or concave surface which is otherwise closed. However, the meritorious effects of the invention can be achieved to a significant degree without a fully closed chamber behind the membrane as long as air flow is caused through the membrane by flexure or displacement thereof. The material of the membrane is not critical as long as the membrane, as suspended, is not significantly subject to inelastic deformations.

In regard to operation of the invention, a number of different effects will be described below as believed by the inventors to contribute to the meritorious effects of the invention. However, these effects may be present to very different degrees or some effects absent entirely from different embodiments of the invention or, indeed, in the action produced by a given embodiment of the invention in response to different objects -and masses and momentums thereof. In fact, the variation of contributions of different effects to the overall effect underlies the adaptive property of the invention to substantially suppress rebound for relatively arbitrary object masses, shapes and speeds.

As alluded to above, when membrane 100 is displaced by an impact from an object/envelope 30, it is displaced in the direction of arrows 115 and a flow of air will be caused in the direction 120 substantially opposite to the impact. Of course, a first energy absorption effect is in the elastic deformation of the membrane, itself which will be dissipated as heat but much of the energy stored in the deformed membrane can potentially be returned.

Several effects are caused by the airflow. First, the shape of the fibers is such that air flowing between them will be slightly compressed. Such compression of the air (or other gas) will cause heating and the heat is dissipated; absorbing energy from the dynamic mechanical system in the process. Further, as the air re-expands, following the surface of the fibers, a small vacuum is created which opposes rebound of envelope/object 30. Viscous drag is also created by the air on the surface of the fibers 110 creating and dissipating heat to remove energy from the dynamic system.

Moreover, the vacuum is enhanced by the laminar flow of air or gas parallel to the surface of the fibers and also over the surface of the envelope/object 30. However, this flow remains laminar only a relatively short distance and results in vortices 130 which further dissipate energy from the system. The effect of these vortices are also enhanced by further vortices 140 which are produced by the inclined axis of the fibers and additional viscous drag is produced by the complex surface shape of the woven fibers where they contact each other.

Again, without wishing to be bound thereby, the inventors believe that the vortices 140 are particularly important to the production of the meritorious effects of the invention and are, themselves complex mechanisms. Viscous drag of a fluid through an aperture is maximized at sharp corners of the aperture and such corners are provided by the woven nature of the preferred membrane where the fibers 110 cross each other. Each of these crossovers provides a vortex-shed condition proportional to the applied pressure on the membrane. This condition accelerates the velocity of the fluid adjacent those intersections which, by the familiar Bernoulli principle, results in a dramatic pressure drop over the relatively substantial area formed by the intersection of fibers of preferably circular cross-section. Further, since the vortex-shed activity is proportional to the applied pressure, the greater the applied pressure, the greater the vortex-shed activity becomes. The increased vortex-shed rotational activity, enhanced by the angular orientation of the fibers at their intersections further accelerates the air mass which further decreases the pressure. The rotational direction of the vortices 140 will also be symmetrically reversed from one aperture to an adjacent aperture; avoiding net rotational aerodynamic forces being applied to the object and confining and concentrating the air flow effects to the close vicinity of the membrane. In short, the geometry of the apertures combined with the surface-contacting, "attached" air molecules combine to form a flow-controlled, very high-velocity dynamic system which maximizes both production of a vacuum positioned to oppose rebound motion and dissipation of energy in a manner which is adaptive over a wide energy range.

More analytically, the velocity augmenting and impelling energy is a product of the collision-induced compressive force imparted into the collective, semi-restrained molecules of the ambient air or gas which is unequally reacted by the physical surfaces presented by the symmetrical lattice membrane and volumetrically restrictive orifices. The partial or full air or gas containment causes the impact energy to produce compression and excess intra-container pressure which, in turn, destabilizes the inflation system equalization and, in so doing, becomes additional energy available to the system of vortices 140. The vortex activity increases in the form of increased rotation which, in turn, accelerates the velocity of the fluid in and around it, increasing the pressure drop available to oppose the rebound motion. The increase in velocity of a fluid, especially at the molecular level, produces a predictably proportional instantaneous and highly localized decrease in pressure of the fluid at each aperture over the entire are of the impact even though the area of each aperture is minute.

These effects, though individually small and of a sufficiently small scale that individual air molecules may be regarded as respective energy receptor units, are produced at each aperture of the membrane at the impact surface and which will be concentrated near the perimeter of the object, as best seen in FIG. 2B. Therefore, elastic buckling is largely suppressed from the absorption of energy and any elastic buckling which does occur is counteracted by and energy absorbed therefrom by the imposition of tension on the edge of the envelope 30 and viscous drag of air over the surface of the envelope (as well as the above-described effects as the membrane returns to its original shape and air flow as described above is reversed. At the same time, viewed at the molecular level, the energy receptor units or air molecules carry only the that portion of the compressive force/energy that is individually and characteristically appropriate for it. Therefore, the system and the underlying active process is actually a solution by division over the population of air molecules constrained by the symmetrical lattice membrane; resulting in a totally mass-adaptive energy conversion and neutralization pressure differential-powered process.

Thus, the invention provides a plurality of mechanisms capable of removing energy from the dynamic system and a plurality of mechanisms for producing a vacuum to oppose the rebounding motion from air flow in the direction of the rebound. For that reason, the invention is highly adaptive to a wide range of object shape, mass, speed and momentum to substantially suppress the rebound action. The energy of the impact force, regardless of magnitude (as long as it can be withstood by the membrane 100) and frequency of application is efficiently and immediately absorbed and converted into impact-induced pressure which is then redirected and dissipated in an orderly and controlled manner.

Since the motion of the object/envelope is arrested effectively and without significant rebound, the object or envelope falls under the influence of gravity through the position indicated at position D when the invention is placed as shown at 100 in FIG. 1 and substantially orderly stacking is achieved. More importantly, this motion is well-controlled and highly repeatable to quickly remove the object/envelope 30 from the path of following incoming objects/envelopes 35 (shown in phantom lines in FIG. 1).

Referring now to FIGS. 3, 4 and 5, variants of the preferred embodiment of the invention will now be discussed. In general, it is believed to be preferable to provide a suspension or mounting arrangement for the symmetrical lattice membrane such that all impact-induced air flow will occur through the lattice membrane by full closure of the volume behind the lattice membrane from the impact location. However, as will be understood by those skilled in the art, the response of the device can be modified or tuned by suitable partial enclosure or venting of the air volume behind the membrane. This perfecting feature of the invention is applicable to all of the variants of the preferred embodiments of the invention which will now be described. Of course, the form of the invention should reflect the intended application.

FIG. 3 shows a particularly simple structure for the invention. In this embodiment, a relatively stiff lattice membrane fabric is assumed. Such a fabric can be formed into a tube or sleeve 310 and the cylindrical shape defined by closed, preferably circular, end-caps 320. In this embodiment, the impact-induced air flow will be provided over the entire surface of the device but will be somewhat concentrated at the impact area since a pressure wave will propagate across the interior of the device following the impact while the impact-induced airflow at the impact area will be substantially instantaneous. Vacuum effects at the impact site will be reduced from the maximum obtainable (since the majority of those effects will not be adjacent the impacting object) but may be optimal or nearoptimal nonetheless. Interior ribs 330, preferably of a flexible material and possibly having air passages 340 therethrough may also be provided to assist in retaining the overall shape of the device over many impacts.

FIG. 4 shows an embodiment including two perfecting features which may be included individually or in combination. First, rather than or in addition to ribs and/or shape-defining end plates, the interior of the device is filled with an open-cell foam material 410 which can provide additional damping of the impact and noise reduction. Second, a recess or open core 420 is provided which accommodates a check valve 430. Use of such a check valve can prevent or limit egress of air or gas other than through the membrane while providing for rapid ingress of air to allow restoration of shape of the device after an impact.

FIG. 5 shows the provision of a container 510 which may be either flexible or rigid with a slotted opening 520 at the impact area. This expedient allows concentration of vacuum effects at the impact area by preventing air flow at other areas. Energy dissipation effects will be concentrated in this area as well while overall deformation of the device will also be more limited.

In view of the foregoing, it is seen that the invention provides an adaptive arresting device for objects being transported to a destination pocket or the like of a sorting/transport system. The arresting device in accordance with the invention absorbs or converts energy readily and limits elastic deformation of the article during rapid deceleration. At the same time, the device in accordance with the invention produces vacuum effects which oppose rebounding motion of the object and provides well-regulated and predictable motion after motion is arrested while dissipating impact energy without damage to the object.

While the invention has been described in terms of a single preferred embodiment, those skilled in the art will recognize that the invention can be practiced with modification within the spirit and scope of the appended claims.

We claim:

1. A device for arresting motion of an object, said device including
    a lattice membrane having apertures therein, and
    means for causing flow of fluid through said membrane when said membrane is displaced or deformed,
    said apertures in said membrane including
        means for causing vacuum effects and vortex activity adjacent said membrane in response to said flow of fluid whereby kinetic energy of said object is dissipated.

2. A device as recited in claim 1, wherein said membrane is a woven membrane and said apertures are formed between fibers in said membrane.

3. A device as recited in claim 2, wherein said fibers in said material have a smooth surface.

4. A device as recited in claim 2, wherein said fibers in said membrane are a polymer.

5. A device as recited in claim 2, wherein said fibers in said membrane are monofilament fibers.

6. A device as recited in claim 1 wherein said membrane is arranged in a cylindrical shape.

7. A device as recited in claim 6, wherein said membrane is supported by at least one of end caps and ribs.

8. A device as recited in claim 6, wherein said membrane is supported by an open cell foam material.

9. A device as recited in claim 1, wherein said membrane is supported by at least one of end caps and ribs.

10. A device as recited in claim 1, wherein said membrane is supported by an open cell foam material.

11. A device as recited in claim 10, further including a check valve.

12. A device as recited in claim 10, wherein said foam material has at least one of recesses and an open core.

13. A device as recited in claim 1, further including a check valve.

14. A device as recited in claim 1, wherein said membrane is supported by an enclosure having an opening and wherein said membrane is located at said opening.

15. A device as recited in claim 14, wherein said enclosure is cylindrical.

16. A device as recited in claim 14, wherein said opening is in the form of a slot.

17. A method of arresting movement of an object, said method comprising steps of
    deflecting a apertured membrane with said object, and
    generating vortices at apertures of said apertured membrane in response to said deflecting step whereby kinetic energy of said object is dissipated, said vortices causing reduced pressure at a surface of said object whereby rebound of said object from said membrane is reduced.

18. A method as recited in claim 17, wherein said step of generating vortices includes causing airflow through apertures between woven fibers.

* * * * *